United States Patent
Trpkovski

(10) Patent No.: US 10,246,936 B2
(45) Date of Patent: Apr. 2, 2019

(54) MASKING SYSTEMS AND METHODS

(71) Applicant: PDS IG Holding LLC, Prairie du Sac, WI (US)

(72) Inventor: Paul Trpkovski, Green Cove Springs, FL (US)

(73) Assignee: PDS IG Holding LLC, Prairie du Sac, WI (US)

( * ) Notice: Subject to any disclaimer, the term of this patent is extended or adjusted under 35 U.S.C. 154(b) by 200 days.

(21) Appl. No.: 14/973,348

(22) Filed: Dec. 17, 2015

(65) Prior Publication Data

US 2016/0177621 A1   Jun. 23, 2016

Related U.S. Application Data

(60) Provisional application No. 62/094,652, filed on Dec. 19, 2014.

(51) Int. Cl.
| | | |
|---|---|---|
| *E06B 9/00* | (2006.01) | |
| *B05D 1/32* | (2006.01) | |
| *C03C 17/00* | (2006.01) | |

(52) U.S. Cl.
CPC .......... *E06B 9/00* (2013.01); *B05D 1/32* (2013.01); *C03C 17/002* (2013.01); *C03C 2218/355* (2013.01)

(58) Field of Classification Search
CPC ....... B05D 1/32; E06B 9/00; C03C 2218/355; C03C 17/002
See application file for complete search history.

(56) References Cited

U.S. PATENT DOCUMENTS

| | | | |
|---|---|---|---|
| 1,996,191 A | * | 4/1935 | Cook ............... A47B 19/06 248/448 |
| 5,866,260 A | | 2/1999 | McCammon et al. |
| 6,973,759 B2 | | 12/2005 | Trpkovski |
| 7,025,850 B2 | | 4/2006 | Trpkovski |
| 7,083,699 B2 | | 8/2006 | Trpkovski |

(Continued)

FOREIGN PATENT DOCUMENTS

| | | |
|---|---|---|
| DE | 10260587 | 7/2004 |
| FR | 2465693 | 3/1981 |

(Continued)

OTHER PUBLICATIONS

"International Preliminary Report on Patentability," for PCT Application No. PCT/US2015/066751 dated Jun. 29, 2017 (10 pages).

(Continued)

*Primary Examiner* — Vishal I Patel

(74) *Attorney, Agent, or Firm* — Pauly, DeVries Smith & Deffner LLC

(57) ABSTRACT

Embodiments provide systems, methods, and masking workstations for masking a planar substrate with a shield. The shield is configured to facilitate the removal of a waste portion of masking material from a portion of a planar substrate. In some cases the shield is placed adjacent to a substrate and a masking material is applied to the substrate and at least a portion of the shield. A waste portion is separated from the masking material and the shield removes the waste portion. Embodiments can be useful for masking only a portion of a planar substrate, including glass panes and glass units, for example.

14 Claims, 14 Drawing Sheets

(56) References Cited

U.S. PATENT DOCUMENTS

| | | | |
|---|---|---|---|
| 7,165,591 | B2 | 1/2007 | Trpkovski |
| 7,691,220 | B2 | 4/2010 | Jean-Pierre et al. |
| 8,652,576 | B2 | 2/2014 | Gonzalez et al. |
| 2003/0012981 | A1 | 1/2003 | Yamada et al. |
| 2003/0041532 | A1 | 3/2003 | Trpkovski et al. |
| 2003/0041533 | A1 | 3/2003 | Trpkovski et al. |
| 2003/0041534 | A1 | 3/2003 | Trpkovski et al. |
| 2003/0047538 | A1 | 3/2003 | Trpkovski et al. |
| 2003/0056905 | A1 | 3/2003 | Kuhn et al. |
| 2003/0087592 | A1 | 5/2003 | Trpkovski et al. |
| 2003/0121218 | A1 | 7/2003 | Spindler et al. |
| 2003/0213187 | A1 | 11/2003 | Trpkovski et al. |
| 2004/0031215 | A1 | 2/2004 | Trpkovski et al. |
| 2004/0123627 | A1 | 7/2004 | Larsen et al. |
| 2007/0221811 | A1* | 9/2007 | Hauser .......... A47B 23/043 248/454 |
| 2009/0176021 | A1 | 7/2009 | Walsh et al. |
| 2012/0243054 | A1* | 9/2012 | Sellers .......... H04N 1/00814 358/448 |
| 2016/0176150 | A1 | 6/2016 | Trpkovski |
| 2016/0176171 | A1 | 6/2016 | Trpkovski |

FOREIGN PATENT DOCUMENTS

| | | | |
|---|---|---|---|
| GB | 2263440 | 7/1993 | |
| WO | 03021054 | 3/2003 | |
| WO | 2004094283 | 11/2004 | |
| WO | 2007060353 | 5/2007 | |
| WO | 2011086340 | 7/2011 | |
| WO | 2013026492 | 2/2013 | |
| WO | WO-2013026492 A1 * | 2/2013 | .......... C23C 14/042 |
| WO | 2014075729 | 5/2014 | |
| WO | 2016100855 | 6/2016 | |
| WO | 2016100860 | 6/2016 | |
| WO | 2016100907 | 6/2016 | |

OTHER PUBLICATIONS

"International Preliminary Report on Patentability," for PCT Application No. PCT/US2015/066765 dated Jun. 29, 2017 (13 pages).

"International Preliminary Report on Patentability," for PCT Application No. PCT/US2015/066856 dated Jun. 29, 2017 (10 pages).

"International Search Report and Written Opinion," for PCT Application No. PCT/US2015/066765, dated Jun. 22, 2016 (19 pages).

"International Search Report and Written Opinion," for PCT Application No. PCT/US2015/066751, dated Apr. 14, 2016 (13 pages).

"International Search Report and Written Opinion," for PCT Application No. PCT/US2015/066856, dated Mar. 29, 2016 (14 pages).

"Invitation to Pay Additional Fees and Partial Search Report," for PCT Application No. PCT/US2015/066765, dated Apr. 1, 2016 (6 pages).

Cassity, "Faux Frosted Glass Tutorial," REMODELaholic 2010 retrieved from URL <https://www.remodelaholic.com/faux-frosted-glass-guest/> Aug. 21, 2018 (17 pages).

"Non-Final Office Action," for U.S. Appl. No. 14/973,229 dated Aug. 31, 2018 (26 pages).

"Non-Final Office Action," for U.S. Appl. No. 14/973,291 dated Oct. 16, 2018 (27 pages).

"Definition of term Strip," Merriam Webster Dictionary retrieved from URL <https://www.merriam-webster.com/dictionary/strip> in 2019 (15 pages).

"Final Office Action," for U.S. Appl. No. 14/973,229 dated Jan. 25, 2019 (13 pages).

"Response to Non Final Office Action," for U.S. Appl. No. 14/973,229, filed Nov. 21, 2018 (9 pages).

"Response to Non Final Office Action," for U.S. Appl. No. 14/973,291, filed Dec. 21, 2018 (7 pages).

* cited by examiner

MASKING SYSTEMS AND METHODS

CLAIM OF PRIORITY

This application claims the benefit of U.S. Provisional Application No. 62/094,652, filed Dec. 19, 2014, the content of which is herein incorporated by reference in its entirety.

FIELD OF THE TECHNOLOGY

This application relates to systems and methods for masking a planar substrate, such as a glass unit. The present application relates more particularly to systems and methods for configuring a mask being applied to a substrate, such as a pane of a glass unit.

BACKGROUND

Nearly all buildings and homes have windows. Windows typically include at least one fragile glass pane disposed within a frame. It is frequently desired that the windows are clear and easy to see through; therefore the glass is normally desired to be free of scratches, cracks or chips. The assembly of the frame around the glass can subject the glass to being damaged. Similarly, transportation and installation of the window can subject the glass to being damaged.

Window manufacturers commonly apply a coating, often referred to as a mask or masking material, to protect a glass pane from these and other types of damage. The masking material can then be removed at some later time, such as after the window is installed.

While the use of a masking material to protect windows is not new, there remains a desire for new and/or improved machines and methods for applying a masking material to a glass pane. Improvements to glass masking systems and processes could also be useful for masking other types of products.

SUMMARY

Embodiments provide masking systems, masking workstations, and methods of masking that can be useful for applying a masking material to a planar substrate, such as a glass pane or other substrate.

In some cases, embodiments provide methods of masking. According to one embodiment, a method of masking a planar substrate includes locating a planar substrate with respect to a support surface, placing a shield over a first portion of the support surface, applying a masking material to the substrate surface and to the shield, separating a waste portion of the masking material from a retained portion of the masking material, and moving the shield and the waste portion away from the planar substrate.

Some embodiments of the invention provide a masking workstation. According to one embodiment, a workstation for masking a planar substrate is provided. The workstation includes a support surface configured to support a planar substrate having a substrate surface. The workstation also includes a shield positionable in a first position away from the support surface and a second position proximate to the support surface and to a planar substrate supported by the support surface. In some cases the planar substrate is a glass pane. In some cases the workstation includes a movement mechanism coupled to the shield that provides the shield with a range of motion including the first position and the second position.

Some embodiments provide a system for masking a planar substrate. An example of such an embodiment includes a workstation, a shield, a masking applicator, a cutting tool, and a movement mechanism that is configured to provide the shield with a range of motion including a first position and a second position. The workstation has a support surface configured to support a planar substrate having a substrate surface. The shield is positionable in a first position away from the support surface. It is also positionable in a second position proximate to the support surface and to a planar substrate supported by the support surface. The applicator is configured to apply a piece of masking material to the substrate surface and to the shield in the second position. The cutting tool is configured to cut the piece of masking material to separate a waste portion of masking material from a retained portion of masking material. In some cases the shield is configured to remove the waste portion of masking material from the substrate surface as it moves away from the substrate.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use with the explanations in the following detailed description. Some embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Many details related to the processes and systems described herein are not described as they are known to those of ordinary skill in the art. Examples of these types of details include methods and structures for moving and handling glass panes and glass units, including webs, rollers, actuators and conveyors. Further examples of these types of details include methods and structures for applying masking material to a glass pane, and methods and structures for handling and moving tools, rolls of masking material and other items.

One aspect of the invention relates to masking or covering at least a portion of a workpiece with a masking material. In some cases, the workpiece has a generally planar surface. For example, in some embodiments a masking material is applied to a workpiece that is a generally planar substrate with two substantially planar surfaces. One example of a planar substrate workpiece is a glass pane. Another workpiece example is a glass unit that is formed from two or more glass panes.

Some embodiments of the invention that will be described in greater detail are embodiments directed to glass panes and glass units. The usefulness of the concepts illustrated herein is not limited to glass panes and glass units, though. Instead, embodiments of the invention can involve the masking of other types of objects and materials, such as, for example, mirrors and polymeric substrates. Accordingly, while this disclosure provides some examples of systems and methods for applying a masking material to glass panes and glass units, it should be appreciated that use of the terms "glass pane" and "glass unit" is not meant to limit the applicability of the invention to other types of substrates. Instead, examples of systems and methods described herein in terms of glass panes and glass units are understood to be generally applicable to other types of planar substrates that could be masked.

Figure 1:
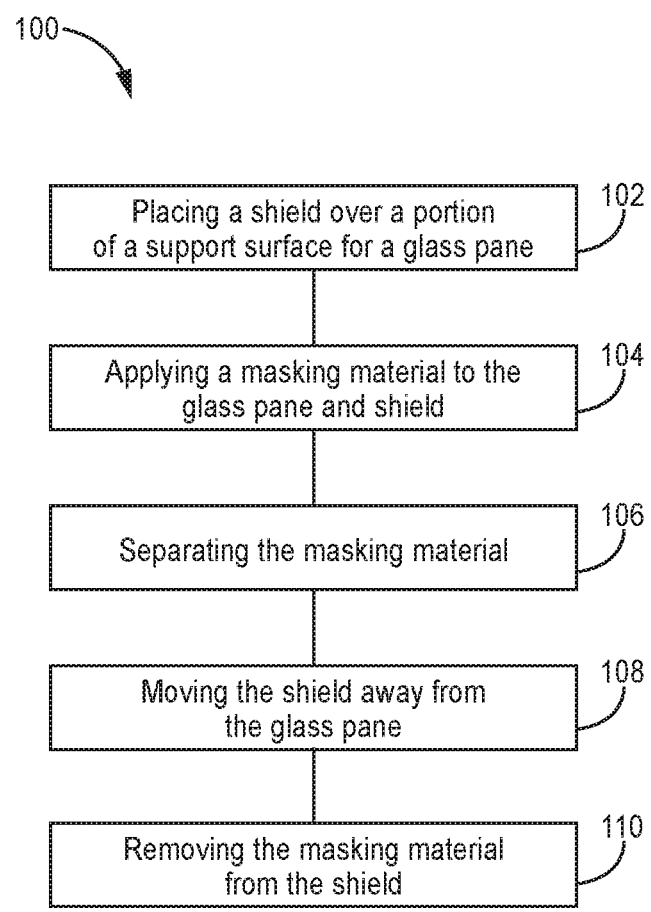
FIG. 1 is a flow diagram depicting a method of masking a glass pane according to an embodiment.

Turning to the drawings, FIG. 1 depicts one possible embodiment of the invention that involves a method 100 of masking a glass pane. The glass pane in this example can generally be described as having a planar body with two substantially planar surfaces that face away from one another. Accordingly, the glass plane is one example of a planar substrate that is to be masked. The method 100 involves applying a masking material to at least one of the surfaces of the pane. In some cases, an embodiment can include applying a masking material to both of the pane surfaces.

Although not shown in FIG. 1, in some embodiments a preliminary step in such a method includes locating the glass pane (or other applicable planar substrate). As used herein, 'locating' generally refers to positioning the glass pane in a known location and/or determining the location of the glass pane, such as its position relative to other equipment, tools, and reference points. For example, a method may include moving (e.g., by hand or by machine) the glass pane to a known location upon a masking workstation. Such movement may be part of a larger process of manufacturing glass panes. As a glass pane is moved from one workstation to a masking workstation, for example, the glass pane may be automatically placed in a pre-determined location at the masking workstation. As another example, locating the glass pane may include determining the relative position of a glass pane already supported by a masking workstation. Locating the glass pane in these and other manners can be useful for aligning or registering masking equipment with the glass pane.

Returning to FIG. 1, the method 100 includes placing 102 a shield over a portion of a support surface configured to support a glass pane. The support surface may be part of a masking workstation that is configured to hold and support a glass pane or other substrate during a masking process. Examples of some workstations will be described with respect to the remaining figures.

In some embodiments, the shield may be manually placed over the portion of the support surface by a worker. In some embodiments, the shield may be automatically placed over the support surface by a machine. According to some embodiments a movement mechanism may guide placement of the shield over the portion of the support surface. As an example, a movement mechanism may guide movement of the shield along a predetermined route to a position that is over the portion of the support surface.

As used herein, the shield being placed over a portion of the support surface can refer to one or more configurations. For example, in some cases a shield surface extends over, is adjacent to and/or contacts the support surface. In this type of embodiment, the shield may also be adjacent to the glass pane or other planar substrate. For example, the shield may be positioned on the support surface next to the glass pane such that adjacent edges of the shield and the glass pane abut substantially along the length of the edges. Some possible embodiments incorporating this type of shield placement will be described further herein with respect to FIGS. 2A-9. In some embodiments, another configuration includes the shield being placed over a portion of the support surface while also being positioned over a portion of a glass pane. In this type of embodiment, the shield is placed over a portion of the glass pane and also over the support surface (with the portion of the glass pane set between the shield and the support surface). Some possible embodiments incorporating this type of shield placement will be described further herein with respect to FIGS. 10A-14B.

A movement mechanism may or may not actually cause the movement of the shield. For example, in some cases a worker may move the shield along the predetermined route by hand with the movement guided by the mechanism, or gravity may cause the shield to move into a desired position. One example of such a movement mechanism could be a pivot that guides and restricts movement of the shield as it is moved by hand.

As another example, a movement mechanism may include an actuator that can move the shield from a position away from the glass pane to a position that is proximate the support surface and/or the surface of the glass pane. For example, in some cases a motor may drive movement of the shield toward and away from the workstation and support surface. Examples of possible motor-driven movement mechanisms include belt drives and ball screws, though other linear actuators and other types of movement mechanisms are possible.

According to some embodiments, a motor-driven movement mechanism (e.g., a ball screw or belt drive) is configured to place the shield over the support surface by making adjustments to the position of the shield with respect to one or more axes of movement. For convenience, some possible movement axes are described now with respect to an embodiment in which the in-plane length of the support surface and glass pane generally extend along a vertical Y axis, providing a reference for an in-plane perpendicular X axis and an out-of-plane perpendicular Z axis. As one example, in some cases a movement mechanism is configured to move the shield along one, two, or all three of a vertical Y axis, an in-plane horizontal X axis, and an out-of-plane horizontal Z axis.

In some possible embodiments, a linear actuator or other movement mechanism may be configured to place the shield over a portion of the support surface by advancing the shield along a vertical Y axis from a first position above the workstation to a second position adjacent to the glass pane and over the portion of the support surface. The same or another movement mechanism may then move the shield along a perpendicular Z axis toward and/or away from the support surface of the workstation and/or the surface of the glass plane. For example, in some cases a linear actuator may move the shield closer to or out away from the support surface along the thickness dimension of a glass pane in order to align an outer surface of the shield with the surface of the glass pane.

Another aspect of placing 102 a shield over a portion of the support surface is positioning the shield with respect to a particular planar substrate upon the support surface, such as a particular glass pane. In various embodiments, manufacturing equipment is designed to handle many different sizes of glass panes on the same equipment. In these embodiments, the shield will be configured to be positioned so that it is over a portion of the support surface supporting and/or adjacent to a particular glass pane, taking into account its particular size and shape.

After placing 102 the shield over a portion of the support surface, the method includes applying 104 a masking material to the glass pane and the shield. The masking material is applied 104 to a masking region of the pane surface and in some cases may also be applied to a nonmask region of the pane surface. The masking material is also applied to at least a portion of the shield. In some cases, the masking material may be applied to all or part of the masking region, all or part of the shield, and all of a nonmask region extending between the masking region and the shield.

According to some embodiments, a single piece of masking material is applied to both the masking region and the shield. For example, in some cases a single, integral sheet of masking material is applied across a portion of the shield and at least a portion of the pane surface that includes at least a portion of the masking region and may include a portion of the nonmask region. In other embodiments, multiple strips or pieces of masking material make up the masking material applied to the masking region and the shield. The systems and methods described herein apply to both of these types of embodiments. In some figures, a single piece of masking material is depicted for simplicity, though it should be understood that multiple strips or pieces of masking material could be used in those environments as well.

FIG. 1 also illustrates that the method 100 includes separating 106 the masking material. In some cases the method includes separating 106 a piece of masking material that spans between the masking region of the glass pane and the shield. For example, the masking material may be separated into at least two separate pieces. In some embodiments the masking material is separated into a waste portion and a retained portion. According to some embodiments, the waste portion of masking material is on a portion of the shield and the retained portion of masking material is on at least a portion of the masking region. It may also be over the entire masking region if only a single sheet of masking material was applied to the pane. In some cases the waste portion of masking material is also on all of a nonmask region that extends between the masking region and the shield.

The sheet or piece of masking material can be separated 106 into a waste portion and a retained portion in any suitable manner. In some cases, the masking material sheet is cut along a boundary of the masking region using a rotary cutting tool, a blade cutting tool, a laser, or another cutting tool. In some embodiments, the shield may be placed over a portion of the glass pane surface and in these cases an edge or side of the shield may in some cases act as a cutting guide. In some embodiments, a cutting tool may be aligned and/or programmed to make a cut along a cut line known to be near to the edge of the shield or known to be along an edge of the masking region.

After separating 106 the masking material into a waste portion and a retained portion, the method 100 includes moving 108 the shield away from the glass pane. This action moves the waste portion of masking material away from the retained portion, and also frees the glass pane from any obstruction by the shield. After the shield is moved away from the pane, the masked pane may be moved to a subsequent workstation for further processing and/or any other desirable post-masking actions.

According to some embodiments, the waste portion is solely or substantially on the shield, and thus moving the shield away from the glass pane also moves the waste portion. This may occur in embodiments in which the shield is placed over the glass pane (and also over the support surface underneath the glass pane) next to the masking region (e.g., as shown in the examples depicted in FIGS. 10A-14B).

In some embodiments, placing the shield over the support surface involves placing the shield next to and adjacent to an edge of the glass plane as shown in the examples depicted in FIGS. 2A-9. In these types of embodiments, the waste masking material may be on a portion of the shield and on a nonmask region extending between the shield and the masking region. After cutting or otherwise separating the retained portion from the waste portion, moving the shield away from the glass pane removes the waste portion that is on the shield and also on the nonmask region of the glass pane. For example, movement of the shield may peel the waste portion off of the glass pane's nonmask region.

According to some embodiments, the method 100 of masking can also include removal 110 of the waste masking material from the shield. For example, in some cases the waste material might be removed from the shield prior to moving the shield away from the glass pane. In some embodiments, the masking process may include removing the waste masking material from the shield after the shield has been moved away from the glass pane. The waste masking material can be removed manually by hand, such as by peeling the material off of the shield. In some embodiments, the waste masking material may be removed automatically by a grabbing or picking tool. In some examples, the picking tool is configured to make use of an adhesive on the waste masking material to adhere the waste masking material to the picking tool. In some examples, a picking tool grasps the waste masking material. In some examples, a vacuum device is used to remove the waste masking material.

Figure 2A:
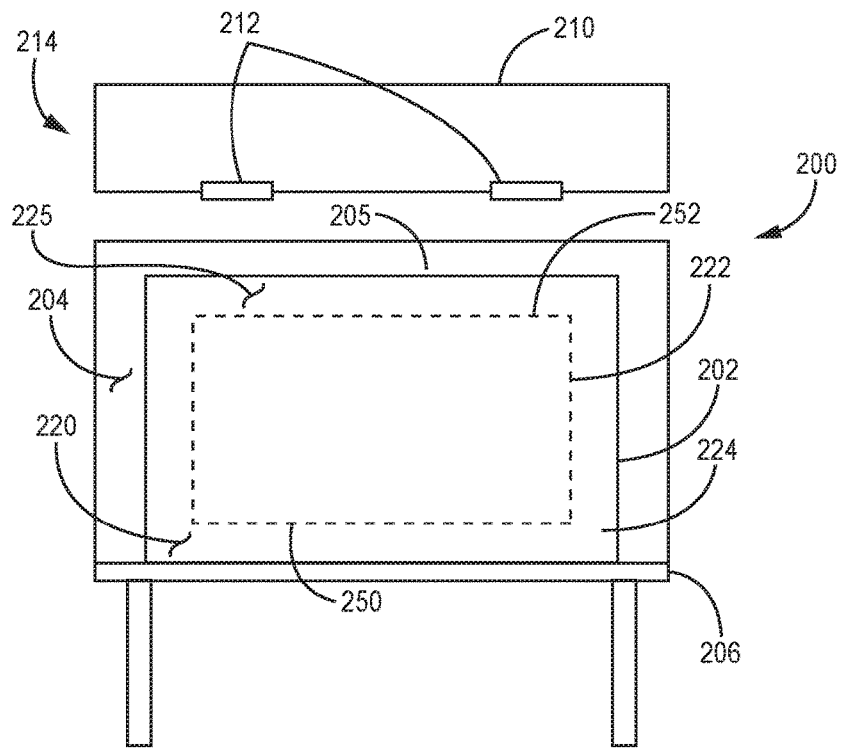
FIG. 2A is a front schematic view of a pane positioned at a workstation having a masking shield in a first position according to an embodiment.

Turning to FIGS. 2A-9, some embodiments of a masking workstation will now be discussed. FIG. 2A is a front schematic view of a workstation 200 supporting a glass pane 202 according to one possible embodiment of the invention. The workstation 200 shown in FIG. 2A includes a planar support surface 204 configured to receive the pane 202. The workstation 200 also includes a shelf 206 extending from the bottom of the support surface 204 that helps maintain the pane 202 in position upon the support surface 204. In this embodiment the workstation 200 is constructed with the support surface 204 reclining from a vertical axis.

In some cases the support surface 204 may have a tilt of about six degrees from a vertical axis. Of course the workstation's support surface 204 could be tilted at any one of a number of other useful angles. For example, in some cases the support surface 204 may be configured so as to be horizontal (i.e., 90° from the vertical), nearly vertical, or at any other angle there between. Other types of workpieces and objects could also be supported by the workstation 200 or a modified version of the workstation 200 and could thus also be masked according to the concepts disclosed herein.

As discussed above, embodiments of the invention provide a masking workstation with a shield that can be useful when applying a masking material to a planar substrate such as a glass pane. As shown in FIGS. 2A-3B, the workstation 200 in this embodiment has a masking shield 210 that can be placed over a portion 205 of the support surface 204 during the process of masking the pane 202. In this embodiment, a movement mechanism in the form of a pivot 212 allows the shield 210 to swing, i.e., rotate or pivot, between an open position 214 shown in FIGS. 2A-2B and a closed position 216 shown in FIGS. 3A-3B. As previously discussed, in some embodiments the shield 210 may be moved manually between the open and closed positions, with the movement guided by the pivot 212. Although not shown, it is also contemplated that an actuator may move the shield 210 as well. In one example, the masking shield includes a rod along its axis of rotation and an actuator rotates this rod to move the shield. In some embodiments, a movement mechanism may be provided as a linear actuator including, for example, a drive belt or a ball screw instead of the pivot 212. Such a movement mechanism may be configured to move the shield 210 in two or more orthogonal axes of movement (e.g., parallel to the support surface 204 and perpendicular to the plane of the support surface 204) to move the shield 210 between an open position and a closed position.

Figure 3A:
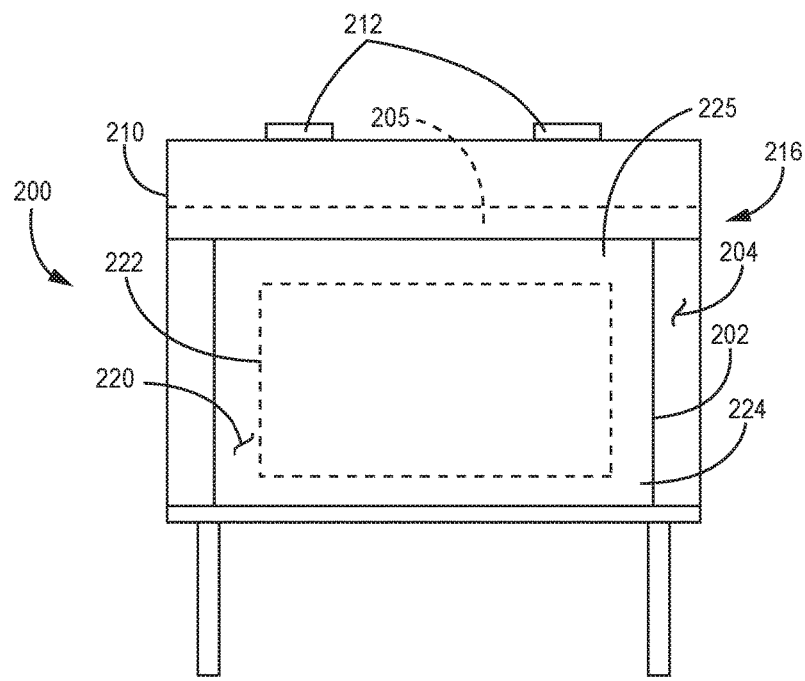
FIG. 3A is a front schematic view showing the masking shield of FIG. 1 in a second position according to an embodiment.

As shown in FIGS. 2A and 3A, the glass pane 202 includes a glass pane surface 220 which is made up of a masking region 222 where masking material will be applied and a perimeter nonmask region 224 where masking material will not be applied. The nonmask region 224 includes a first portion 225 adjacent to one edge of the glass pane surface 220. The first portion 225 of the nonmask region is also adjacent to the shield 210 in the second position 216. In some cases the masking region 222 can be described as having a first end 250 and a second end 252.

Figure 2B:
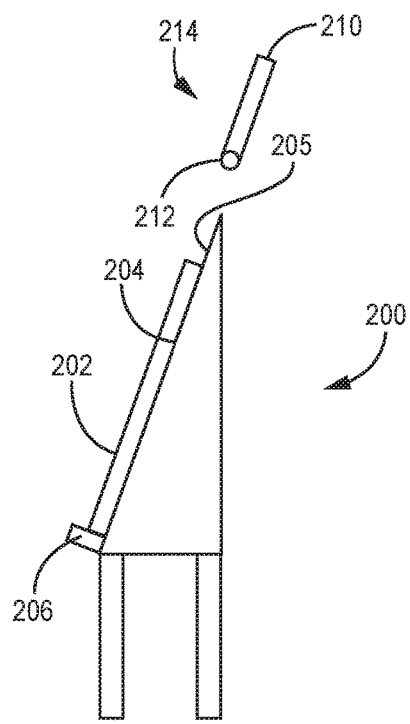
FIG. 2B is a side schematic view showing the masking shield in the first position depicted in FIG. 2B.
Figure 3B:
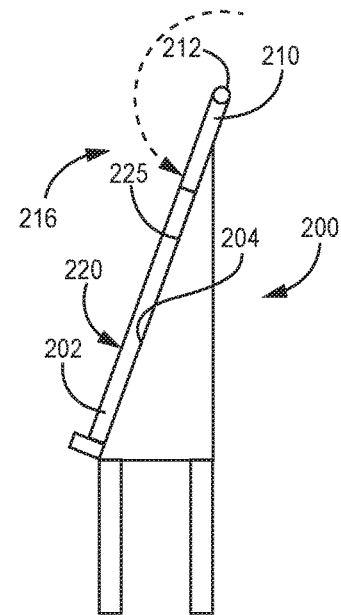
FIG. 3B is a side schematic view showing the masking shield in the second position depicted in FIG. 3A.

As shown in FIGS. 2A-2B, the open position 214 provides the shield 210 with an orientation that is up and away from the workstation's support surface 204. The pivot 212 provides the shield 210 with a circular range of motion that allows it to sweep down into the second position 216 over a portion 205 of the support surface 204 that is adjacent to the edge of the glass pane, and also adjacent a top portion 225 of a nonmask region 224 on the surface 220 of the glass pane 202. As shown in FIGS. 3A and 3B, in the second position 216, the shield 210 is positioned over the portion 205 of the support surface 204 and adjacent to the glass pane 202, and in particular to the portion 225 of the nonmask region on the glass pane 202.

Figure 4A:
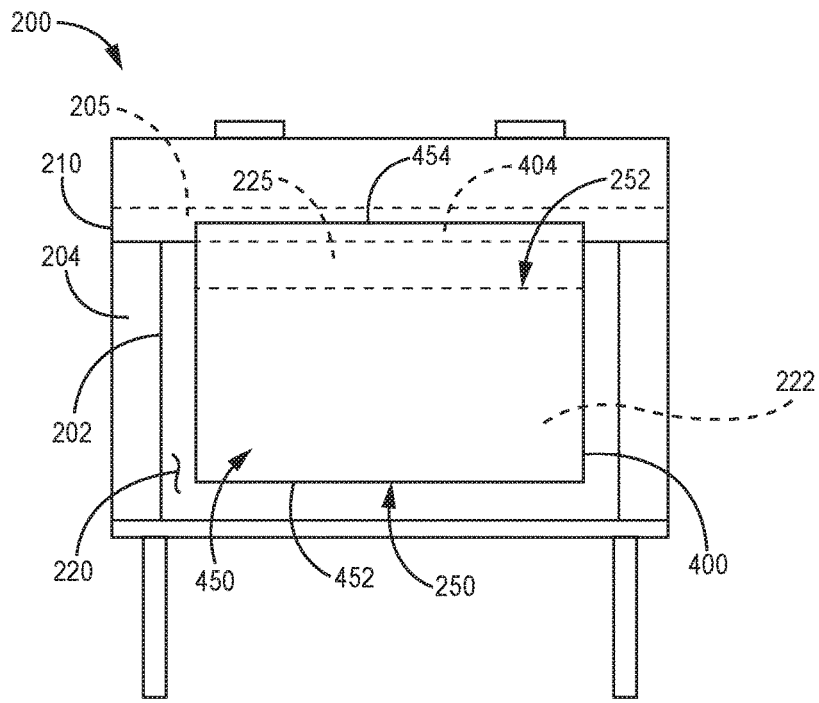
FIG. 4A is a front schematic view of the pane and the workstation of FIG. 3A with a masking material applied according to an embodiment.
Figure 4B:
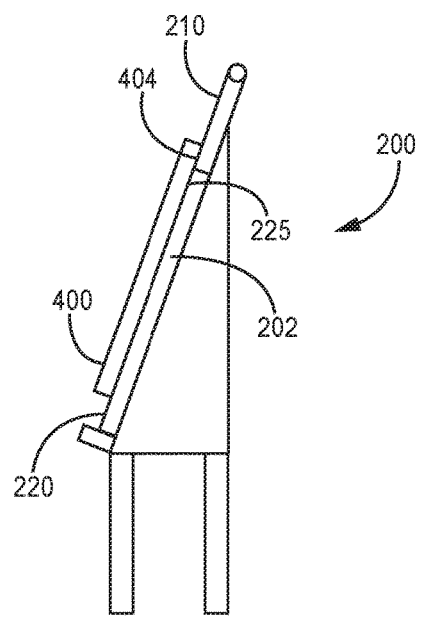
FIG. 4B is a side schematic view showing the masking material depicted in FIG. 4A.

Placing the shield 210 over the support surface portion 205 and adjacent to the nonmask portion 225 thus allows a masking material to be applied to the masking region 222, the nonmask portion 225, and at least part of the shield 210 all at the same time. FIGS. 4A-4B are front and side schematic views, respectively, of the workstation 200 with the shield 210 placed over the portion 205 of the support surface 204 and a masking material 400 applied to the pane surface 220. More specifically, in this embodiment the masking material 400 is applied to the masking region 222 of the pane surface 220. As the masking material 400 is applied to the masking region 222, the masking material 400 is also applied to the nonmask portion 225 and to at least a portion 404 of the shield 210. In this embodiment, the shield 210 receives a portion of the masking material 400, which can be useful for removing the masking material applied to the nonmask portion 225 as will be discussed further herein.

It should be appreciated that the schematic views shown in FIGS. 4A-4B are not drawn to scale, and in particular that the thickness of the masking material 400 is exaggerated with respect to the shield 210 and the glass pane 202 to aid in visualizing the embodiment.

According to some embodiments, the masking material can be applied to the pane surface and the shield using any known device or technique. A masking material applicator could be, for example, a vacuum roller that retains the masking material with a negative pressure and then releases the masking material onto the pane surface. Other types of known applicators can also be used as may be desirable.

In some cases one or more sheets of masking material may be cut from a roll of masking material or may be otherwise provided. In many cases, the masking roll, and thus also the sheets of masking material, have a width that is the same as the length or width of the masking region Referring back to FIGS. 4A and 4B, according to some embodiments of the invention, one sheet 450 of the masking material 400 may be sized to cover the entire masking region 222, i.e., the portion of the glass pane 202 that is to be masked. In this type of embodiment, the sheet of masking material 400 is also one single piece of masking material that is applied to both the pane surface 220 (i.e., the masking region 222 and the nonmask portion 225) and the shield 210. In this case, a first end 452 of the sheet 450 is applied at one end 250 of the masking region 222. The sheet 450 covers the entire masking region 222, the nonmask portion 225, and the portion 404 of the shield 210 such that the second end 454 of the sheet is located on the shield.

According to some embodiments, multiple pieces of masking material may be applied to the pane surface. For example, several adjacent and/or overlapping sheets or strips of masking material may be used to cover the masking region. In these situations, two or more sheets of masking material can be combined to cover some to nearly the entire masking region. An additional piece of masking material is applied to the remaining portion of the masking region not covered by the other sheets. This piece is also applied to at least a portion of the shield.

Figure 5A:
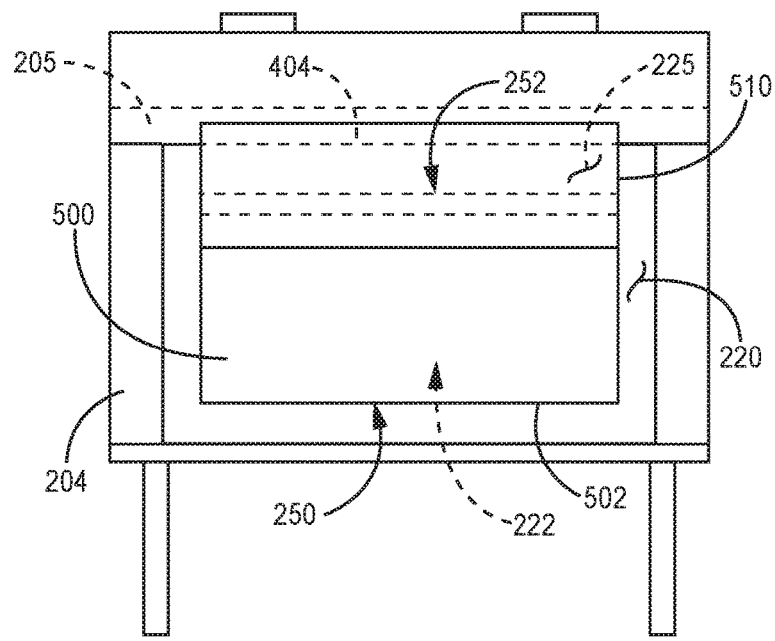
FIG. 5A is a front schematic view depicting a pane with multiple pieces of a masking material applied according to an embodiment.
Figure 5B:
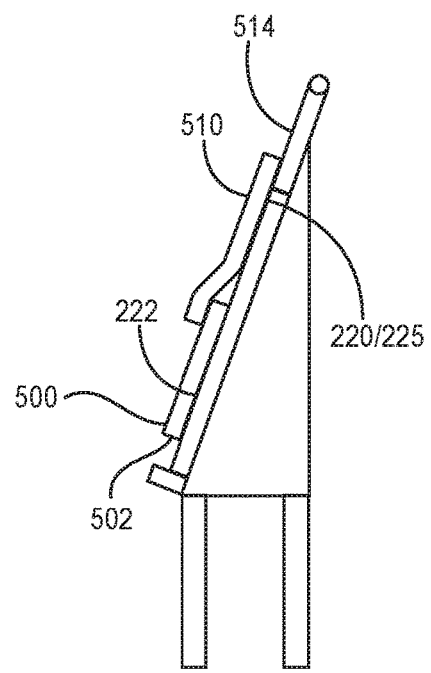
FIG. 5B is a side schematic view showing the masking material depicted in FIG. 5A.

FIGS. 5A and 5B show an embodiment with two sheets of masking material. A first sheet 500 of masking material is applied to the masking region 222, with one end 502 of the first sheet 500 aligned with one end 250 of the masking region. This first sheet 500 of masking material covers some, but not the entire masking region 222. In this embodiment, a second sheet 510 of masking material is applied to the remaining portion of the masking region, the nonmask portion 225 of the pane, and also to a portion 404 of the shield 210. The shield 210 is placed over the portion 205 of the support surface 204 and the second sheet 510 of masking material is applied to at least the portion 404 of the shield and to the remaining portion of the surface of the glass pane, which in this case is the nonmask region 225 and the part of the masking region 222 not covered by the first sheet 500 of masking material.

Thus, whether one sheet or multiple sheets of masking material are applied to a pane, at least one of the sheets extends from the pane surface onto the shield. Accordingly, the masking material covering the masking region has three defined edges, with the fourth edge to be determined through a cutting or other separation process as described above.

Figure 6A:
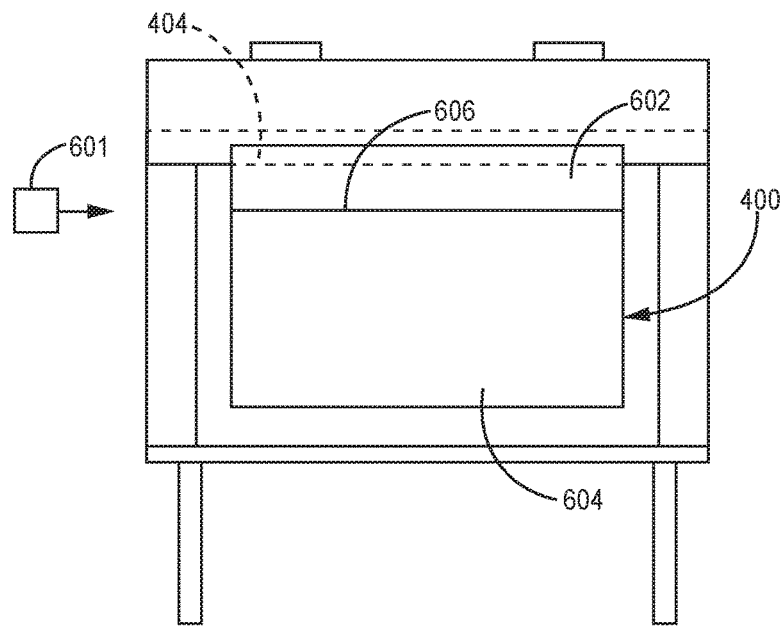
FIG. 6A is a front schematic view depicting a cut in the masking material of FIG. 4A according to an embodiment.
Figure 6B:
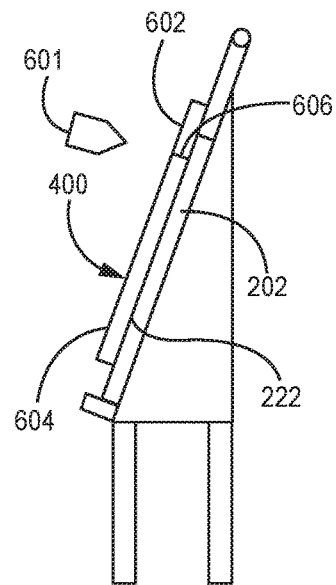
FIG. 6B is a side schematic view showing the masking material and the cut depicted in FIG. 6A.

Turning to FIG. 6A and FIG. 6B, in some cases a masking system and method of masking a glass unit will include a cutting device 601 for separating the masking material 400 into a waste portion 602 and a retained portion 604. Different types of separating actions may be used. As one example, in some cases a cutting tool is used to make a cut 606 in the masking material 400, thus forming the waste portion 602 and the retained portion 604. The cutting tool can be any known cutting tool, and could include, for example, a rotary cutting tool or a straight blade cutting type of tool. A laser could also be used in some cases if it does not damage the underlying glass pane or the shield material.

According to some embodiments, the masking system is configured to separate the single masking piece into two pieces along a boundary of the masking region. In some embodiments, a cutting tool may be aligned and/or programmed to make a cut along a cut line known to be near to an edge of the masking region.

Figure 7A:
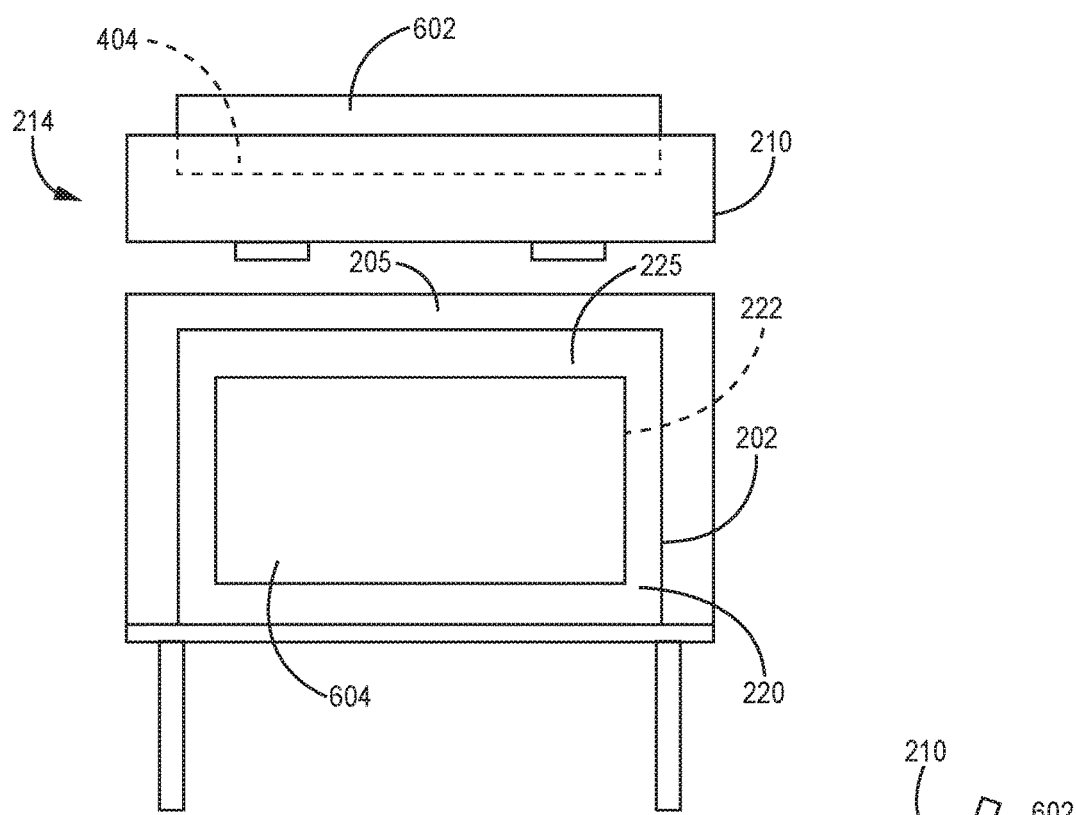
FIG. 7A is a front schematic view showing the masking shield and a portion of the masking material of FIG. 6A in the first position according to an embodiment.
Figure 7B:
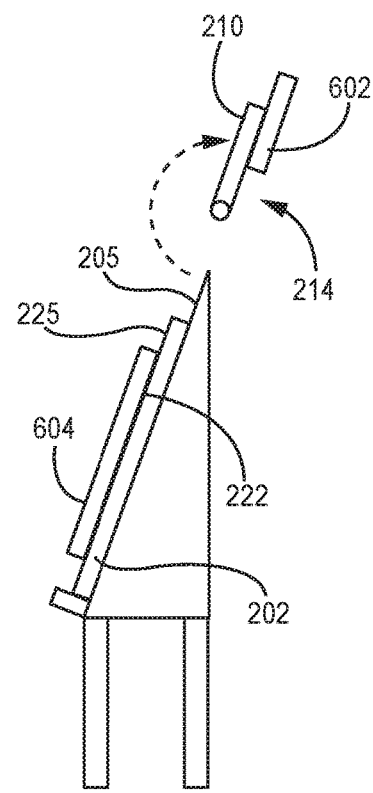
FIG. 7B is a side schematic view showing the masking shield and masking material position depicted in FIG. 7A.

FIGS. 7A and 7B show the masking shield 210 and the waste portion 602 of the masking material of FIG. 6A in the first position 214 first illustrated in FIGS. 2A and 2B. The shield 210 can be moved from the second position 216 shown in FIGS. 3A-6B back to the first position 214 after the masking material covering the masking region 222, the nonmask portion 225, and the portion of the shield is cut or otherwise separated. As the shield 210 is moved from the second position 216 to the first position 214, the shield carries the waste portion 602 of the masking material away from the glass pane 202 and the masking region 222. As discussed above, in some embodiments the waste portion 602 is also applied to the nonmask portion 225, directly adjacent to the masking region 222. In these types of situations, the shield 210 may pull or peel the waste portion 602 from the nonmask portion 225 as the shield moves into the first position.

As discussed above, in some cases a movement mechanism can include one or more actuators that are configured to move the shield in two or more orthogonal directions with respect to the surface of the glass pane 202. According to some embodiments, moving the shield 210 away from the glass pane 202 can assist in separating the waste portion 602 of the masking material from the retained portion 604 of the masking material. As one example, a linear actuator may be configured to move the shield 210 in a linear movement instead of a rotational movement as depicted. The linear movement can include moving the shield 210 out away from the glass pane 202 and the masking workstation along a Z axis that is generally perpendicular to the surface of the glass pane 202. In some cases this perpendicular movement can help separate the two portions of masking material 602, 604 after the cut 606 is made. After the waste portion 602 is separated from the retained portion 604, the movement mechanism can then translate the shield away from the glass pane in a direction generally parallel with the surface of the glass pane.

Figure 8A:
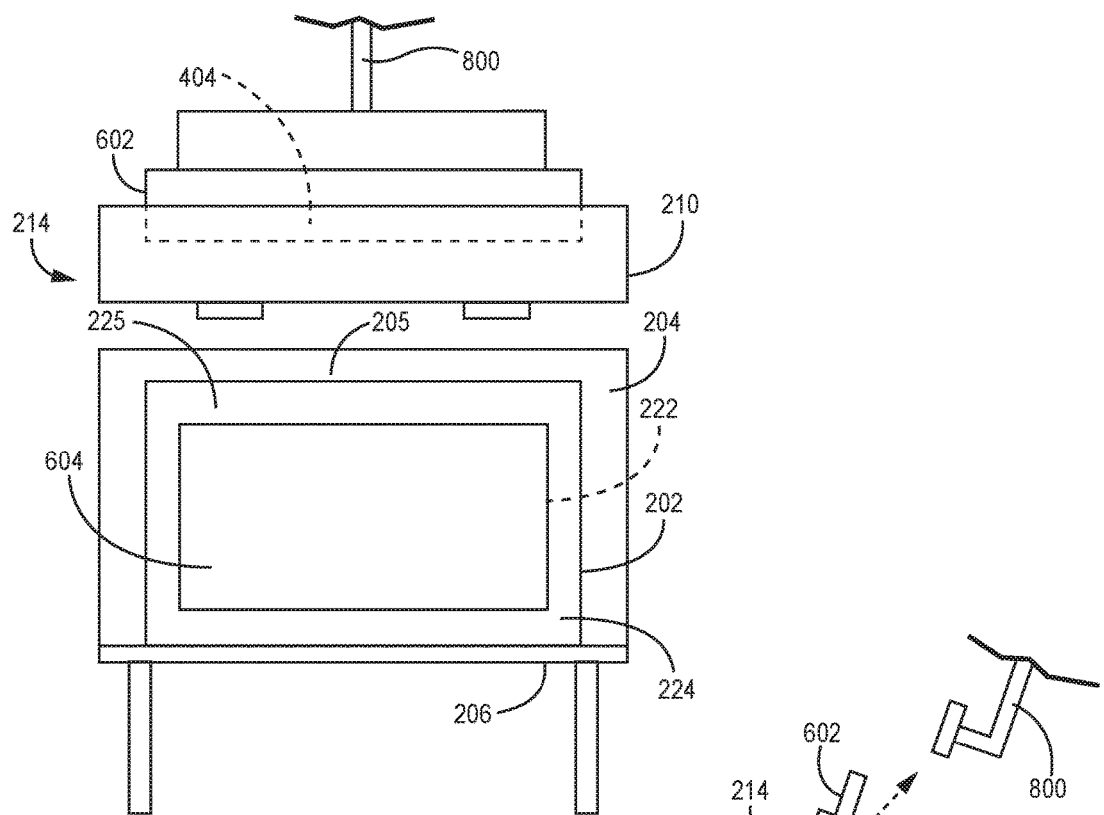
FIG. 8A is a front schematic view of the pane and the workstation of FIG. 7A depicting the removal of the masking material from the masking shield according to an embodiment.
Figure 8B:
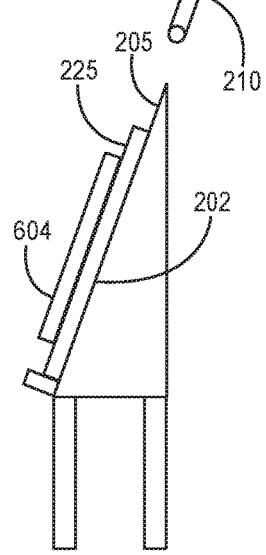
FIG. 8B is a side schematic view showing the removal of the masking material depicted in FIG. 8A.

FIGS. 8A and 8B show the workstation of FIG. 7A and one possible example of removing the waste masking material 602 from the masking shield 210. As shown in FIGS. 8A and 8B, in some embodiments, the waste portion 602 may be removed automatically by a removal tool 800. For example, the removal tool 800 can be a picking tool that is configured to remove the waste portion 602 by contacting an adhesive on the waste portion, thus adhering to the waste portion 602 so that the waste portion moves with the picking tool 800. In some embodiments removal tool is configured to grasp or grab the waste portion 800. In some examples, a removal tool includes a vacuum device that can be used to remove the waste portion 602 from the shield 210. Other removal mechanisms are also possible. In addition, in some cases the waste masking portion 602 can be removed manually by hand, such as by peeling the material off of the shield.

Figure 9:
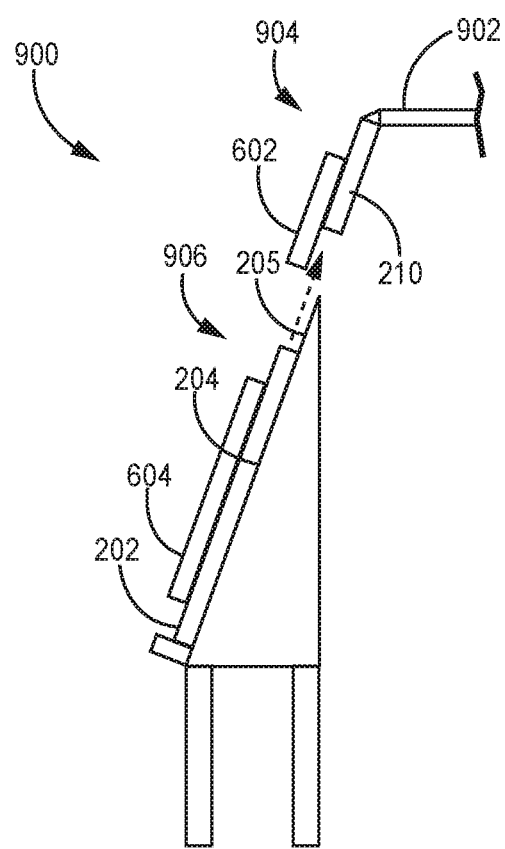
FIG. 9 is a side schematic view of a workstation and a masking shield configuration according to an embodiment.

FIG. 9 depicts an additional embodiment in which a masking workstation 900 includes another type of movement mechanism 902. The movement mechanism 902 moves the shield 210 between the first and the second positions, and could be provided by a mechanical or robotic arm, for example. Other types of movement mechanisms can also be used, including for example, linear actuators such as belt drives and ball screws.

In this case the movement mechanism 902 moves the shield 210 between a first position 904 and a second position 906 that is adjacent to a portion 205 of the support surface 204 of the masking workstation 910. For example, after separating the waste portion 602 from the retained portion 604 of the masking material, the movement mechanism 902 can first move the shield 210 out away from the support surface 204 along a first axis 950 that is generally perpendicular to the support surface 204. In some cases this type of movement can help separate any parts of the masking material that remain stuck together and can also help peel or pull any part of the waste portion 602 off of the glass pane 202. In some cases a vacuum may be used to retain the glass pane 202 against the support surface 204 as the shield is moved away from the pane.

The movement mechanism 902 may then translate the shield and waste portion 602 up and away from the support surface 205 and glass pane 202 along a second axis 952 that is generally parallel with the support surface 204.

Depending on the thickness of the shield 210, the thickness of the glass pane 202, and other aspects of a masking workstation, different amounts of movement, and different configurations for the shield 210 can be provided. For example, according to some embodiments, a movement mechanism may provide the shield with at least one inch (2.5 centimeter) of travel toward and away from a workstation support surface 204. This amount or another amount of travel can sometimes be useful to position the shield in a location that is adjacent to the glass pane with the surface of the shield coplanar with the surface of the glass pane. According to some embodiments, the shield 210 may be at least ⅜$^{th}$ inch (0.95 centimeter) thick so that the shield can abut an edge of the glass pane while also being coplanar with the glass pane. In some cases the shield 210 can have a thickness that is approximately equal to a thickness of the glass pane 202.

As previously discussed with respect to FIG. 1, in some cases placing a shield over a first portion of the support surface includes placing the shield over a portion of the substrate surface located over the portion of the support surface. Thus, the shield in this configuration is overtop the substrate, which is overtop the portion of the support surface, thus placing the shield also over the portion of the support surface. Turning now to FIGS. 10A-14B, some embodiments of a masking workstation 1000 providing a shield with this type of configuration will now be discussed.

Figure 10A:
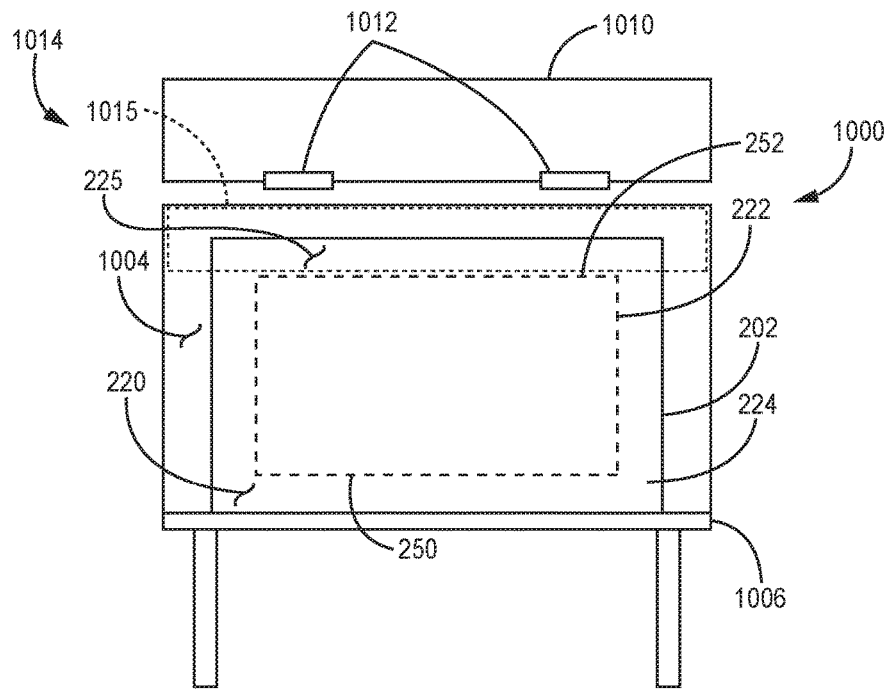
FIG. 10A is a front schematic view of a pane positioned at a workstation having a masking shield in a first position according to an embodiment.

FIG. 10A is a front schematic view of a workstation 1000 supporting the glass pane 202 depicted in FIGS. 2A-9 according to one possible embodiment of the invention. The workstation 1000 shown in FIG. 10A includes a planar support surface 1004 configured to receive the pane 202. The workstation 1000 also includes a shelf 1006 extending from the bottom of the support surface 1004 that helps maintain the pane 202 in position upon the support surface 1004. In this embodiment the workstation 1000 is constructed with the support surface 1004 reclining from a vertical axis. The support surface 1004 may have a tilt of about six degrees from a vertical axis or another angle as described above with respect to FIGS. 2A and 2B.

Some embodiments of the invention provide a masking workstation with a shield that can be useful when applying a masking material to a planar substrate such as a glass pane. As shown in FIGS. 10A-11B, the workstation 1000 in this embodiment has a masking shield 1010 that can be placed over the nonmask portion 225 of the glass pane 202 and thus also over a portion 1015 of the support surface 1004 during the process of masking the pane 202. In this embodiment, a movement mechanism in the form of a pivot 1012 allows the shield 1010 to swing, i.e., rotate or pivot, between an open position 1014 shown in FIGS. 10A-10B and a closed position 1016 shown in FIGS. 11A-11B. As previously discussed, in some embodiments the shield 1010 may be moved manually between the open and closed positions, with the movement guided by the pivot 1012. Although not shown, it is also contemplated that an actuator may move the shield 1010 as well. In one example, the masking shield includes a rod along its axis of rotation and an actuator rotates this rod to move the shield.

Figure 10B:
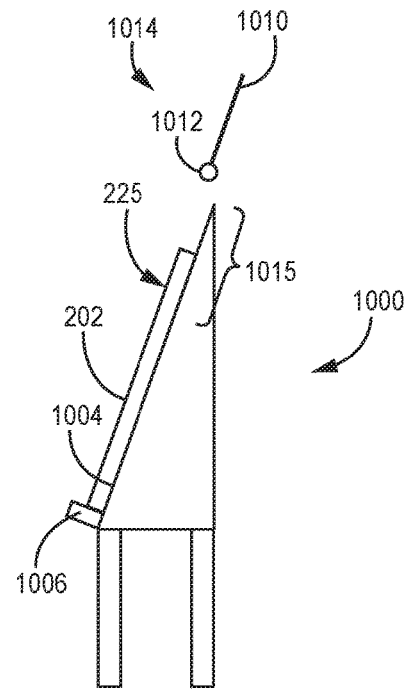
FIG. 10B is a side schematic view showing the masking shield in the first position depicted in FIG. 10A.
Figure 11A:
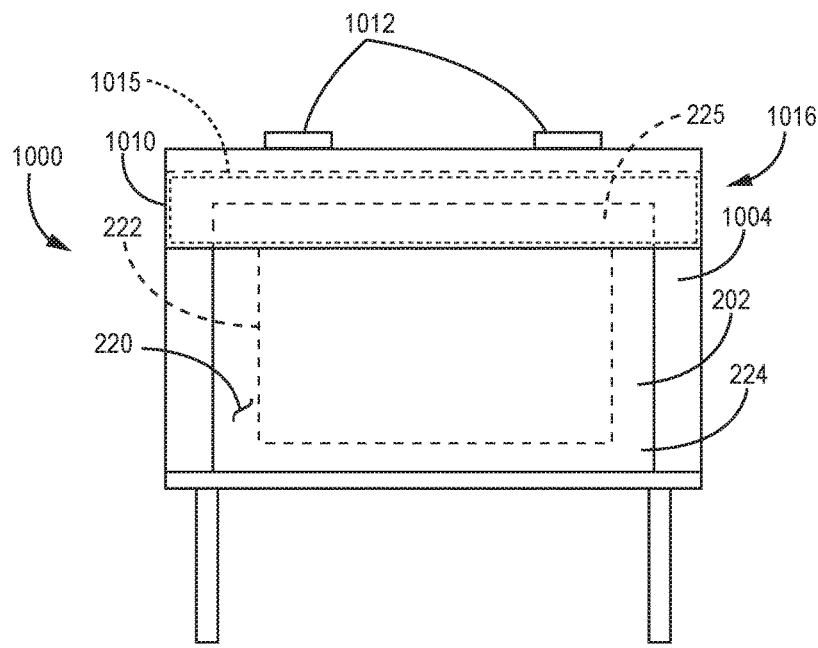
FIG. 11A is a front schematic view showing the masking shield of FIG. 10A in a second position according to an embodiment.
Figure 11B:
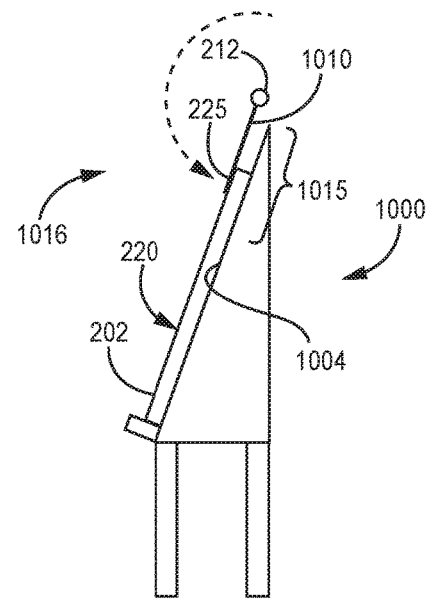
FIG. 11B is a side schematic view showing the masking shield in the second position depicted in FIG. 11A.

As shown in FIGS. 10A-10B, the open position 1014 provides the shield 1010 with an orientation that is up and away from the workstation's support surface 1004. The pivot 1012 provides the shield 1010 with a circular range of motion that allows it to sweep down into the second position 1016 over the nonmask portion 225 of the glass pane 202 and also over the portion 1015 of the support surface 1004 that is positioned beneath the nonmask portion 225. As shown in FIGS. 11A and 11B, in the second position 1016, the shield 1010 is positioned over the portion 1015 of the support surface 1004 and also adjacent to the nonmask portion 225 of the nonmask region 224 in the sense that the shield 1010 is placed on top of the nonmask portion 225 and is thus also adjacent to the nonmask portion 225.

Figure 12A:
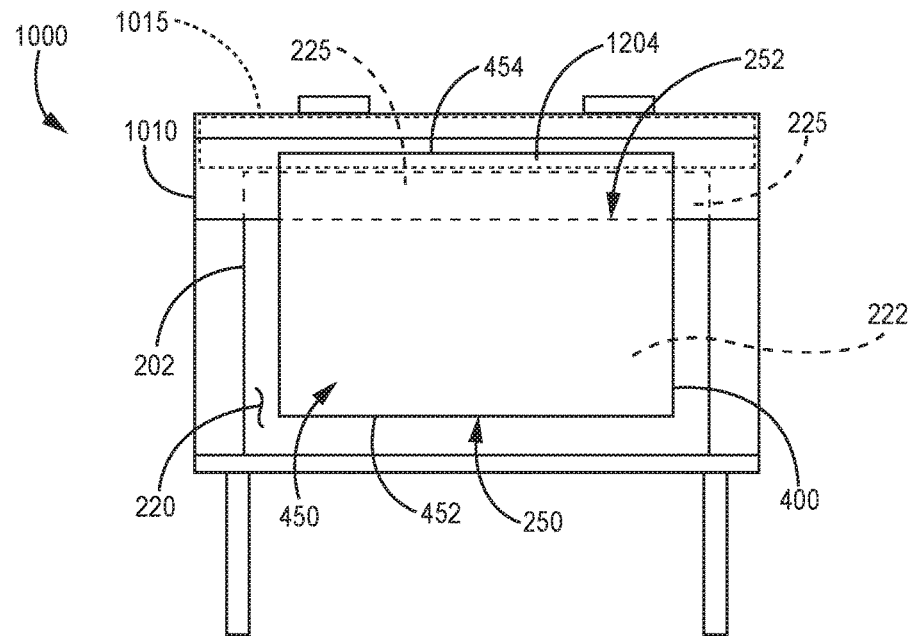
FIG. 12A is a front schematic view of the pane and the workstation of FIG. 11A with a masking material applied according to an embodiment.
Figure 12B:
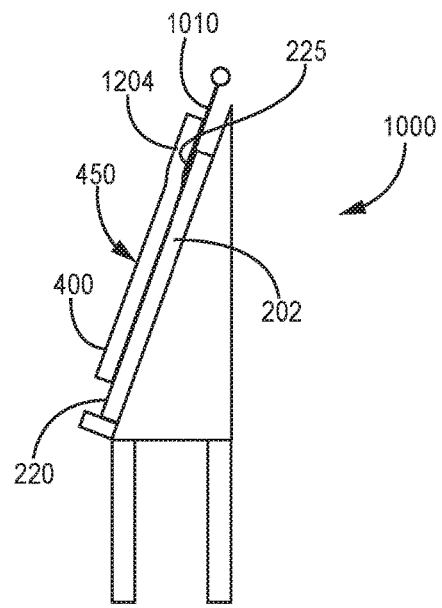
FIG. 12B is a side schematic view showing the masking material depicted in FIG. 12A.

Placing the shield 1010 over the support surface portion 1015 and over the nonmask portion 225 of the glass pane 202 allows a masking material to be applied to the glass pane's masking region 222 and a portion of the shield 1010, but not to the nonmask portion 225, which forms the top border of the nonmask region 224 as shown in the figures. FIGS. 12A-12B are front and side schematic views, respectively, of the workstation 1000 with the shield 1010 placed over the nonmask portion 225 of the pane surface 220 and a masking material 400 applied to the pane surface 220. More specifically, in this embodiment the masking material 400 is applied to the masking region 222, but not to the nonmask portion 225 of the nonmask region 224. As the masking material 400 is applied to the glass pane's surface 220, the masking material 400 is also applied to at least a portion 1204 of the shield 1010. In this embodiment, the shield 1010 stops the masking material 400 from being applied to the nonmask portion 225 of the pane surface, thus leaving the nonmask portion 225 of the pane surface as an unmasked region. Thus, the shield 1010 helps configure the size and shape of the masking region 222 and the size and shape of the masking material 400 that ultimately contacts the pane surface 220.

It should be appreciated that the schematic views shown in FIGS. 12A-12B are not drawn to scale, and in particular that the thickness of the masking material 400 is exaggerated with respect to the shield 1010 and the glass pane 202 to aid in visualizing the embodiment. In addition, while the shield 1010 can have any desirable thickness, in some embodiments the thickness of the shield 1010 is substantially smaller than the thickness of the workstation's support surface 1004. In some embodiments, the thickness of the shield 1010 may approach the thickness of the masking material 400. In some cases the shield's thickness may be closer to the thickness of the masking material 400 than to the thickness of the workstation support surface 1004. In some embodiments, the thickness of the shield may be about 1.0 millimeter, or may be less than about 1.0 millimeter. According to some embodiments, the shield 1010 having such a thickness may be formed from a very thin sheet of metal, such as stainless steel, or may be composed of a plastic material with similar dimensions.

According to some embodiments, the masking material can be applied to the pane surface and the shield using any known device or technique. A masking material applicator could be, for example, a vacuum roller that retains the masking material with a negative pressure and then releases the masking material onto the pane surface. Other types of known applicators can also be used as may be desirable. Further, in some cases one or more sheets of masking material may be cut from a roll of masking material or may be otherwise provided. In many cases, the masking roll, and thus also the sheets of masking material, have a width that fills at least one dimension of the masking region.

Referring back to FIGS. 12A and 12B, according to some embodiments of the invention, one sheet 450 of the masking material 400 may be sized to cover the entire masking region 222, i.e., the portion of the glass pane 202 that is to be masked. In this type of embodiment, the sheet of masking material 400 is also one single piece of masking material that is applied to both the masking region 222 and the shield 1010. In this case, a first end 452 of the sheet 450 is applied at one end 250 of the masking region 222. The sheet 450 covers the entire masking region 222 and extends onto the portion 1204 of the shield 1010 so that the second end 454 of the sheet is located on the shield. In this type of embodiment, the shield 1010 defines one of the ends 252 of the masking region 222, thus ensuring that masking material 400 is not applied to the surface of the nonmask portion 225 of the glass pane extending under the shield and outside the masking region.

Although not depicted in FIGS. 10A-14B, in some embodiments, multiple pieces of masking material may be applied to the pane surface 220 in a fashion similar to the embodiment depicted in FIGS. 5A and 5B. For example, several adjacent and/or overlapping sheets or strips of masking material may be used to cover the masking region. In these situations, two or more sheets of masking material can be combined to cover some to nearly the entire masking region. An additional piece of masking material is applied to the remaining portion of the masking region not covered by the other sheets. This piece is also applied to at least a portion of the shield.

Thus, whether one sheet or multiple sheets of masking material are applied to a pane, at least one of the sheets extends from the pane surface onto the shield. Accordingly, the masking material covering the masking region has three defined edges, with the fourth edge to be determined through a cutting or other separation process as described above.

Figure 13A:
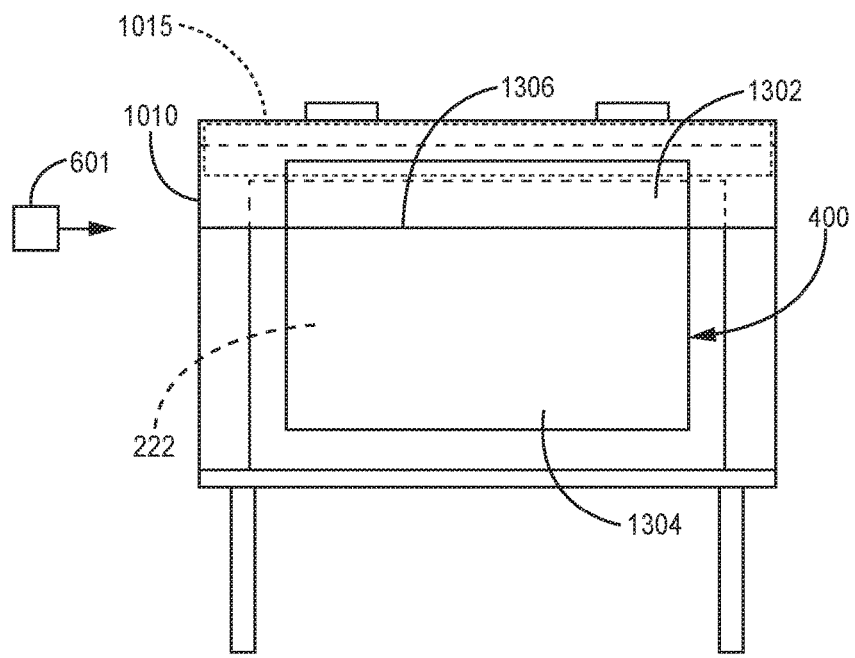
FIG. 13A is a front schematic view depicting a cut in the masking material of FIG. 4A according to an embodiment.
Figure 13B:
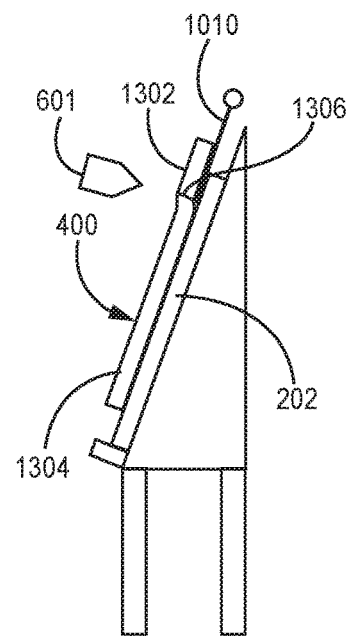
FIG. 13B is a side schematic view showing the masking material and the cut depicted in FIG. 13A.

Turning to FIG. 13A and FIG. 13B, in some cases a masking system and method of masking a glass unit will include a cutting device 601 for separating the masking material 600 into a waste portion 1302 and a retained portion 1304. Different types of separating actions may be used. As one example, in some cases a cutting tool is used to make a cut 1306 in the masking material 400, thus forming the waste portion 602 and the retained portion 604. The cutting tool can be any known cutting tool, and could include, for example, a rotary cutting tool or a straight blade cutting type of tool. A laser could also be used in some cases if it does not damage the underlying glass pane or the shield material.

According to some embodiments, the masking system is configured to separate the single masking piece into the retained portion 1304 and the waste portion 1302 by separating the masking material 400 along a line 606 proximate to the edge of the shield 1010. For example, the edge of the shield 1010 may be used as an approximate guide for a cutting tool that travels along the edge of the shield 1010. In some embodiments, a cutting tool may be aligned and/or programmed to make a cut along a cut line 606 known to be near to the edge of the shield 1010 and/or near a boundary of the masking region 222.

Figure 14A:
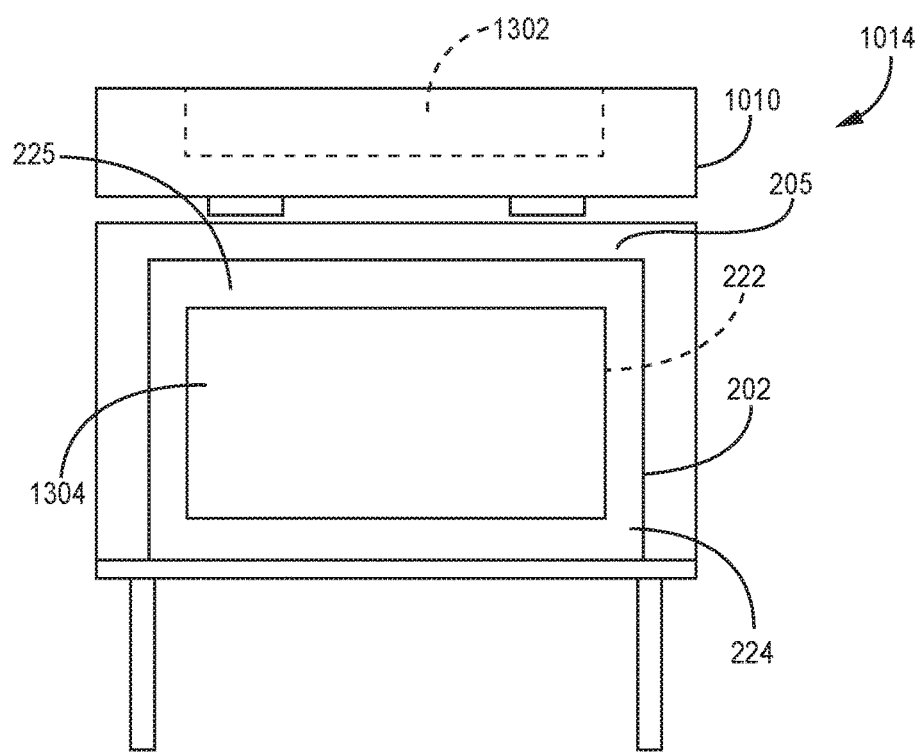
FIG. 14A is a front schematic view showing the masking shield and a portion of the masking material of FIG. 13A in the first position according to an embodiment.
Figure 14B:
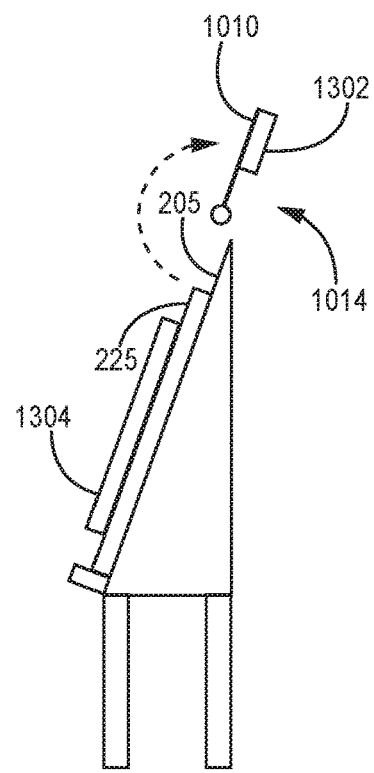
FIG. 14B is a side schematic view showing the masking shield and masking material position depicted in FIG. 14A.

FIGS. 14A and 14B show the masking shield 1010 and the waste portion 1302 of the masking material of FIG. 13A in the first position 1014. The shield 1010 can be moved from the second position 1016 shown in FIGS. 11A-13B back to the first position 1014 after the masking material covering both the masking region and a portion of the shield is cut or otherwise separated. As the shield 1010 is moved from the second position 1016 to the first position 1014, the shield carries the waste portion 1302 of the masking material away from the glass pane 202 and the masking region 222. After moving the shield 1010 from the second position 1016 to the first position 1014, the waste portion 1302 can be removed as described above with respect to FIGS. 8A and 8B.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A masking workstation for masking a glass unit, comprising:
a support surface configured to support the glass unit having a substrate surface;
a shield positionable in a first position away from the support surface and a second position proximate to the support surface and to the glass unit supported by the support surface; and
a movement mechanism coupled to the shield, wherein the movement mechanism is configured to provide the shield with a range of motion including the first position and the second position;
wherein in the second position the shield is positionable over only a portion of the support surface.

2. The masking workstation of claim 1, wherein the glass unit comprises a glass pane and the substrate surface comprises a surface of the glass pane.

3. The masking workstation of claim 1, wherein the movement mechanism comprises an actuator that moves the shield.

4. The masking workstation of claim 1, wherein the shield comprises an edge, the glass unit comprises an edge, and wherein the shield in the second position is adjacent to a first portion of the support surface and abuts the glass unit along the edge of the shield and the edge of the glass unit.

5. The masking workstation of claim 1, wherein the shield in the second position is adjacent to a first portion of the substrate surface.

6. The masking workstation of claim 5, wherein the shield comprises a layer of material comprising at least one of metal and plastic.

7. A system for masking a planar substrate, comprising:
a workstation comprising a support surface configured to support the planar substrate having a substrate surface;
a shield positionable in a first position away from the support surface and a second position proximate to the support surface and to the planar substrate supported by the support surface;
an applicator configured to apply a piece of masking material to the substrate surface and to the shield in the second position;
a cutting tool configured to cut the piece of masking material to separate a waste portion of masking material from a retained portion of masking material; and
a movement mechanism configured to provide the shield with a range of motion between the first position and a second position;

wherein the shield is further configured to remove the waste portion of masking material from the substrate surface as the shield moves from the second position to the first position.

8. The system of claim 7, wherein the planar substrate is a glass unit comprising a glass pane and wherein the substrate surface comprises a pane surface of the glass pane.

9. The system of claim 7, wherein the movement mechanism comprises a pivot.

10. The workstation of claim 7, wherein the shield comprises an edge, the planar substrate comprises an edge, and wherein the shield in the second position is adjacent to a first portion of the support surface and abuts the planar substrate along the edge of the shield and the edge of the planar substrate.

11. The masking workstation of claim 1, further comprising: an applicator configured to apply a strip of masking material to the substrate surface and to the shield in the second position.

12. The masking workstation of claim 1, further comprising a cutting tool configured to cut a piece of masking material to separate a waste portion of masking material from a retained portion of masking material.

13. The masking workstation of claim 1, wherein the shield is further configured to remove a waste portion of masking material from the substrate surface as the shield moves from the second position to the first position.

14. A workstation for masking a planar substrate, comprising:
- a support surface configured to support the planar substrate having a substrate surface;
- a shield positionable in a first position away from the support surface and a second position proximate to the support surface and to the planar substrate supported by the support surface;
- a movement mechanism coupled to the shield, wherein the movement mechanism is configured to provide the shield with a range of motion including the first position and the second position; and
- an applicator configured to apply a strip of masking material to the substrate surface and to the shield in the second position.

* * * * *